Patented Dec. 21, 1943

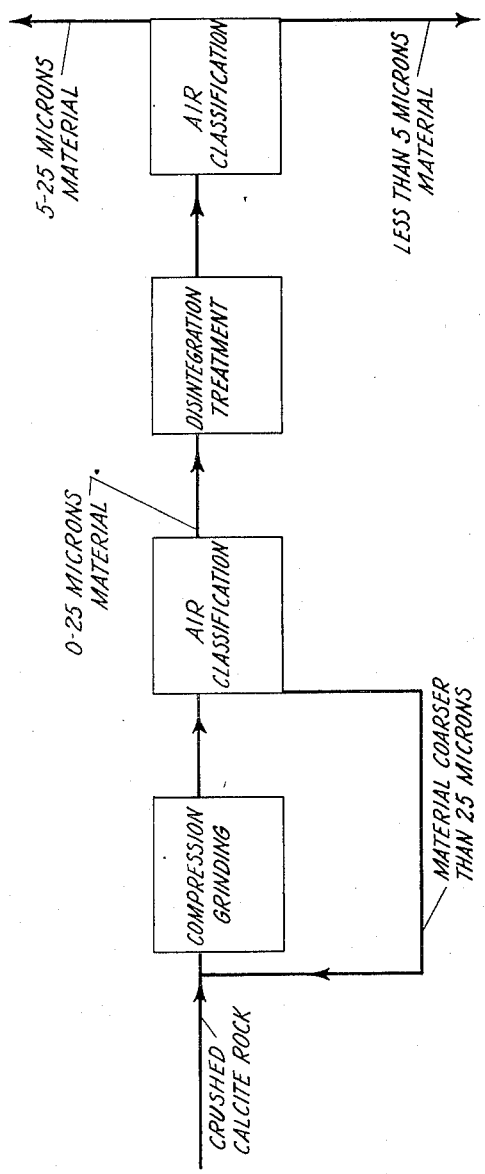

2,337,162

UNITED STATES PATENT OFFICE 2,337,162

PROCESS FOR MAKING IMPROVED PIGMENTS

Ray L. McCleary, Wilmington, Del., assignor to E. I. du Pont de Nemours & Company, Wilmington, Del., a corporation of Delaware Application November 27, 1941, Serial No. 420,677

2 Claims. (Cl. 83—94)

This invention relates to the art of white pigment materials. More particularly it relates to the manufacture of extenders, such as calcium carbonate, having improved particle size and mix-in characteristics as well as improved pigment properties, and the blending thereof with prime pigments.

It is well known that prime white pigments such as titanium dioxide, zinc sulfide, zinc oxide, and the like having a refractive index of more than about 2, are frequently mixed with white extender materials such as barytes, blanc fixe, calcium sulfate, whiting, siliceous materials, e. g., talc, diatomaceous earth, and the like, having a refractive index of not more than 1.7. These extenders are used in coating compositions not only as a cost reducing diluent for the prime pigment but to actually increase the efficiency of the pigment and to impart certain flow and film properties to the paint.

Due to the low specific gravity, the consequent high bulking value, and other desirable features of calcium carbonate, magnesium silicates, diatomaceous earth, and other siliceous extenders, they have been recognized as valuable components of composite pigments in making flat or low sheen oil finishes. The perfect flat paint surface should be free from gritty particles which appear as peaks above the general surface. The diffusion of reflected light should be provided by even, almost microscopic elevations of the surface, occurring in a close ordered but random distribution. This kind of surface is not obtained with pigments comprising ordinary ground extender materials because either the materials contain grit which breaks the flat smoothness of the paint surface or, upon further grinding to break up the grit particles, the bulk of the materials becomes so fine that the paint film develops a sheen and is characterized as gloss or semi-gloss surface. Attempts have been made to reduce the gritty particles by passing the paint between polished metal rollers revolving at different speeds and spaced so closely that the coarse particles must be crushed. However, the action of these rolls is not entirely selective and the tendency to overall reduction in fineness still exists. Furthermore, the metal removed from the rolls during vigorous grinding is a hazard to the whiteness of the product. The grinding of the paint in a ball mill is subject to both the excessive reduction of average size and contamination from the mill. The best extender to use for imparting flatness to a film appears to be one of controlled particle size in which the coarse gritty particles are essentially absent.

This invention has as an object the production of improved materials. A further object is the production of extender materials having improved qualities for use in the preparation of flat coating compositions. A still further object is to produce extender materials substantially all of which comprise particles having a diameter of between about 5 and about 25 microns. A still further object is to prepare relatively coarse non-gritty extenders which exhibit unique mix-in properties. A still further object is to prepare composite pigments comprising prime pigments blended with these improved extenders. Additional objects will become apparent from an examination of the following description and claims.

These objects are attained according to the hereindescribed invention which broadly comprises subjecting naturally occurring extender materials to the step of compression grinding accompanied by the steps of air classification.

In a more restricted embodiment this invention comprises subjecting crushed naturally occurring extender materials to compression grinding and classification in a closed circuit and thereafter subjecting the resulting fine material to treatment in a disintegrator.

A preferred embodiment of this invention comprises subjecting crushed naturally occurring extender materials having a specific gravity between about 2 and about 2.9, an average refractive index between about 1.5 and about 1.7, and a hardness on Mohs' scale between about 1 and about 4, preferably calcium carbonate, to compression grinding and classification in a ring-roller mill equipped with a whizzer type of air separator and thereafter subjecting the resulting fine material to disintegration, thereby producing an extender material substantially all of the particles thereof having a micron size not greater than about 25 and being further characterized by freedom from substantial amounts of material of the usual pigment fineness, i. e., less than 5 microns. The accompanying flow-sheet drawing diagrammatically illustrates one embodiment of my invention.

To give a better understanding of the preparation and properties of the products obtained and of the tests used the following terms are defined.

*Compression grinding.*—This term is used to represent the treatment obtained in mills which impart a compressing or packing action to the pigment being ground, there may also be some rubbing or triturating action. Such mills include ball mills, rod mills, pan mills, ring-roller mills, and the like. Specific examples are such well known mills as the chaser mill, Raymond roller mill, and Williams mill, etc.

*Disintegration.*—This refers to a dispersing action of the mill on the ground material. The moving members of the mill run at high speed and strike the suspended particles of material driving them against stationary breaker plates or against oppositely moving members. With particles in the size range of this invention there is essentially no grinding of the primary particles, but only a dispersion of aggregates. Such mills include multiple cage mills, swing hammer mills, "Mikropulverizers" (of the type shown at page 1915, Perry's Chemical Engineers' Handbook, second edition), and the like.

*Tinting strength.*—This test is designed to measure the ability of a pigment, in this case a white pigment, to cover or lighten the tint of a colored pigment when both are mixed together in an oil paste. Tinting strength is chiefly a property of prime pigments but the extender blended with a pigment affects the tinting strength of the composite. Consequently, extenders are evaluated by conducting tinting strength tests on composites of a standard pigment blended with the extenders. In this work the composites tested contained 30% by weight of a standard titanium dioxide pigment.

In operating the test 3.0 grams of the sample is blended with 0.3 gram of ultramarine blue and from 1.0 to 1.3 cc. of acid refined linseed oil of 12.5 acid number. The paste is prepared by mulling for 3 minutes under a 15 lb. weighted muller. The standard paste is prepared in exactly the same manner except that the amount of ultramarine blue is varied to obtain a shade of blue to match the sample paste. Both pastes are compared side by side in contact with each other on a clear glass slide by viewing through the glass. Usually a series of standards is made up and the sample compared with the nearest standard. The interval between two adjacent standards should not be more than about 5% of the strength value.

The tinting strength equivalent of each standard is inversely proportional to the amount of blue present in that standard while the numerical value of the prime standard is assigned arbitrarily. Thus, if the standard containing 3.0 grams of pigment and 0.3 gram of ultramarine blue is assigned a tinting strength value of 195, another standard which contains 0.325 gram of blue will have a strength equivalent of $$\frac{.3}{.325} \times 195 \text{ or } 180$$

When the sample paste, containing 0.30 gram of blue per 3.0 grams of pigment is found to match the 180 standard the sample is said to have a 180 strength.

This test is essentially that described in "Paint, Oil and Chemical Review," April 16, 1924, by J. E. Booge and H. E. Eastlack.

*Oil absorption.*—Is the amount of oil required to wet 100 grams of pigment. The method of testing is described on pages 540–541 of the 8th (January, 1937) edition of "Physical and Chemical Examination of Paints, Varnishes, Lacquers and Colors," by Henry A. Gardner.

*Color.*—In this instance is the apparent whiteness of an oil paste of a pigment relative to a standard similarly prepared and expressed in units on an arbitrary scale. The minimum perceptible difference is regarded as one point of color but a bluish cast is favored while yellow tints are penalized. The details of the procedure are described by J. E. Booge and H. E. Eastlack in "Paint, Oil and Chemical Review," April 9, 1924. On the color scale used in grading the products of this invention a grading of at least 12 is necessary for qualification as a good white pigment. The whitest known extended titanium dioxide pigments would be graded at about 16 on the same scale.

*Mix-in pigment particle size.*—The term "Mix-in pigment particle size" refers to the size of the discrete particles and aggregates of a pigment in a paint composition prepared by simple mixing of dried finished pigment and paint vehicle. More particularly, it relates to the number of discrete pigment particles and aggregates of pigment particles in .00025 cubic centimeter of a paint composition, containing 0.1163 percent of pigment by volume, which are larger than a predetermined size such as 6 microns, 10 microns, or 20 microns in diameter.

To determine mix-in pigment particle size, 500 grams of pigment and approximately 100 grams of a linseed oil vehicle consisting of 52% by weight of "Z" body kettle bodied linseed oil of 11 acid number and 48% by weight of petroleum spirits as defined by A. S. T. M. Tentative standard D235–26T issued in 1926, are mixed for 20 minutes in a pony mixer designated as 23G of the Kent Machine Works and described on page 1283 of Perry's "Chemical Engineers' Handbook" (1934). Said mixer is provided with a receptacle or pot 7 inches in diameter and 5 inches deep rotating at the rate of 60 revolutions per minute, the paddles of said mixer rotating in the reverse direction at the rate of 64 revolutions per minute. The actual weight of linseed oil vehicle employed varies with the nature of the pigment being tested. The linseed oil vehicle is added to the 500 grams of pigment in just sufficient amount so that the paste obtained at the end of 20 minutes mixing in the aforementioned pony mixer gives a penetrometer reading of 25 mm. with 150 grams load when tested according to the procedure outlined on pages 596–597 of the 8th (January, 1937) edition of "Physical and Chemical Examination of Paints, Varnishes, Lacquers and Colors," by Henry A. Gardner, and employing the cone type penetrometer specified for A. S. T. M. tentative standard D217–27T, described on pages 930–35 of the "Proceedings of the American Society for Testing Materials," vol. 27, part I (1927). The sides and paddles of the pony mixer are scraped down at the end of 1 minute of mixing time, and again at the end of the 20 minute mixing period. An additional quantity of the aforementioned linseed oil vehicle is then added to the paste in amount sufficient to provide 250 grams of said vehicle in the paste; the mixture is stirred for an additional minute in the pony mixer and is then removed from said mixer. A sample of said paste is diluted to a concentration of 1.163 cubic centimeter pigment per liter of thinned paint by stirring with an additional amount of the linseed oil vehicle used in the preparation of said paste. The weight in grams of pigment in one liter of the thinned paint will be 1.163 times the specific gravity of the pigment. A sample of the thinned paint so obtained is placed in a 100 micron deep glass cell and examined at 500 diameters magnification using transmitted light from a carbon arc. A pigment which by this test shows less than 100 particles per 0.00025 cubic centimeter of thinned paint, that are larger than $n$ microns in diameter is defined as having a mix-in pigment particle size of $n$ microns. It is to be understood that these particles thus observed include both primary particles and aggregates that have not been dispersed in the mixing operation.

This test may be applied to composite pigments and also to extender materials. In testing the mix-in particle size of extenders it is more critical to test them in the absence of the prime pigment as I have done in this work. A calcium carbonate which by this test shows less than 100 particles per 0.00025 cubic centimeter of thinned paint that are larger than 20 microns in diameter and not more than one that is larger than 25 microns is defined as having a mix-in particle size of 20 microns. Such a product will be well suited for the preparation of a flat paint by simple mixing of the pigment with the vehicle and the paint surface will not be marred by lumps, etc., protruding above the average level of the film surface. Higher mix-in pigment particle size values tend to cause departure from true flat films toward gritty films.

*Film particle count.*—The term "Film particle count" refers to the number of particles and aggregates which appear as objectionable grit in a dried film of a paint composition prepared by simple mixing of a dried finished pigment and a paint vehicle. More particularly it relates to the number of projections above the surface of said film having diameters of 50 microns or more.

A suitable method for determining film particle count comprises mixing 500 grams pigment and sufficient of a vehicle consisting of 75% by weight "Z" body kettle bodied linseed oil of 11 acid number and 25% by weight petroleum spirits as defined by A. S. T. M. tentative standard D235-26T issued 1926, to provide a pigment-vehicle mixture comprising 35.7% pigment by volume to 64.3% vehicle by volume, for 20 minutes in a pony mixer, such as set forth at page 1283 of Perry's 1934 Chemical Engineers' Handbook, and provided with a receptacle or pot 7 inches in diameter and 5 inches deep, adapted to rotate at the rate of 60 revolutions per minute and the paddles of which pony mixer rotate at the rate of 64 revolutions per minute in the reverse direction. The sides and paddles of the pony mixer are scraped down at the end of 1 minute of mixing time and again at the end of the 20 minute mixing period. The thick pigment-vehicle mixture thereby produced is passed once through a three-roll paint roller mill having rolls 6" in diameter and with 0.003" clearance between said rolls. The first roll in said mill rotates at a speed of 21 revolutions per minute, the second at 63 revolutions per minute, and the third at 189 revolutions per minute. Passage of said mixture through the paint roller mill set with such wide clearance between the rolls effects little if any grinding of the pigment material but does insure thorough and reproducible mixing of the pigment and vehicle. A 300 gram sample of the resultant mixed paint is diluted with more of the linseed oil vehicle to provide a paint consisting of 17.6% pigment by volume and 82.4% linseed oil-petroleum spirits vehicle by volume. Petroleum spirits are then added with stirring in sufficient amount to produce a paint having a consistency of 5.0N, as determined by the modified Stormer viscometer test described on pages 1272-77 of Perry's "Chemical Engineer's Handbook" (1934). The resultant paint is allowed to stand 20 hours after which 0.7% by weight of 6% cobalt naphthenate drier and 1.8% of 24% lead naphthenate drier, on the basis of the vehicle weight, are added with stirring. The thinned paint is strained through a 48 thread per inch x 60 thread per inch cotton paint strainer and spun out on a "Pyralin" slide rotating at 480 R. P. M. The film so produced is allowed to dry in a dust-free atmosphere and is then examined at 20 diameters magnification, under illumination at an angle of 18°26'12", using a high intensity microscope lamp, and the number of projections, noted per 10 square centimeters of paint film, above the surface of said film having diameters of 50 microns or more, are counted. The numerical figure thereby obtained is defined as "film particle count."

In practicing my invention I may employ a variety of mechanical means to effect the desired treatment of the extender material. The compression grinding step may be accomplished by any apparatus such as ball mills, roller mills, ring-roller mills, stamp mills, etc. This type of grinder may be used in a batch operation whereby the charge is ground and removed from the mill as a unit, or the material may be passed continually, or intermittently through said mill. The compression ground material may then be subjected to any suitable means of air classification in which the fine particles are separated from the coarse particles at a predetermined size. The coarse material may then be reground and reclassified. The classifiers that I may use may derive their classifying action from the differential effect of gravity and an opposing air current on the various particles suspended in the air; or, they may derive their action from the differential effects of centrifugal action and an opposing air current on said particles; or they may employ a combination of all three forces.

The material may be passed through the compression grinding step and the classifying step separately or continuously in series. A desirable arrangement is to have the compression grinding and classification steps in closed circuit with each other and operating continuously. The fine material which passes the classification step is then passed through the disintegrator. Usually, in this continuous arrangement I employ a ring-roller mill, such as a Raymond mill or a Williams mill, which is equipped with the whizzer type of air separator whereby the coarse aggregates and particles are returned to the compression zone. In operating this system, I prefer to maintain approximately a maximum grinding load in the mill. The collected fines are then subjected to a disintegration step to disperse any aggregates of fines that may have formed in the compression grinding zone.

It should be noted in this invention that while I subject suitably crushed material to the steps of dry compression grinding, air classification and disintegration that I am not limited to the use of these steps in the order given nor to a process which employs each step only once. For instance, when I desire to produce a particularly efficient flatting material, in which essentially all particles lie in the particle size range of from about 5 microns to about 25 microns, I may employ a second air classification step following the disintegration step. Another modification of my process may place the disintegration step between the compression grinding step and the air classifying step. To summarize, there are three arrangements of steps which I may employ to obtain my herein-described improved results:

A. Compression grinding, air classification, disintegration.

B. Compression grinding, disintegration, air classification.

C. Compression grinding, air classification, disintegration, and air classification.

This invention may be more readily understood from an examination of the following examples which are given for illustrative purposes and are not intended to place any restrictions or limitations on the herein-described invention:

Example I

A sample of calcite rock comprising 99.2% $CaCO_3$ was suitably crushed to a size which passed a screen having 4 meshes to the inch. 2000 lbs. were fed into a rotary roller mill equipped with a double whizzer and having a separation chamber six feet in diameter at the rate of 1000 lbs. per hour. The whizzer was operating at 225 R. P. M. Air was passed upward through the mill at the rate of 7500 cu. ft. per minute. The fines which were not recirculated by the whizzer were continuously passed through a rotary hammer mill and bagged out. The resulting product was easily incorporated in a paint by simple mixing and the film resulting from the application of the paint was free of grit and presented a very satisfactory flat finish.

The dry material was tested and found to have the following properties:

| | |
|---|---|
| Color[1] | 13 |
| Oil absorption[1] | 12.4 |
| Tinting strength[1] | 160 |
| Weight percent over 25 microns | Less than 0.5 |
| Mix-in pigment particle size | 20 |
| Film particle count | Less than 5 |

[1] Blended with 30 weight percent of titanium dioxide.

Example II

Crushed calcite similar to that used in Example I was fed to the rotary ring roller mill of Example I at the rate of about 1800 lbs. per hour. The whizzer was not operated and the air speed through the mill was adjusted so that the product carried out of the mill substantially passed a screen having 325 meshes per inch. The product removed from the mill was collected and fed continuously to a disintegrator to disperse any aggregates. The disintegrated material was then air classified and the coarse particles returned to the compression grinding zone. The resulting product was characterized by the following properties:

| | |
|---|---|
| Color[1] | 14 |
| Oil absorption[1] | 10 |
| Tinting strength[1] | 140 |
| Weight percent over 25 microns | Less than 0.5 |
| Mix-in pigment particle size | 20 |
| Film particle count | Less than 5 |

[1] Blended with $TiO_2$ to give a 30% $TiO_2$ composite.

Example III

The process of Example I was repeated with the addition of an air classifying step in series with and following the disintegrator. The classifier, set to make the size separation at about 5 microns, separated about 40% of the material as fine and 60% as coarse product. The coarse fraction was substantially all between 5 microns and 25 microns in diameter and was characterized as follows:

| | |
|---|---|
| Color[1] | +13 |
| Oil absorption[1] | 10 |
| Tinting strength[1] | 135 |
| Weight percent over 5 microns | 98 |
| Weight percent over 25 microns | Less than 0.9 |
| Weight percent between 5 and 25 microns | 97.1 |
| Mix-in pigment particle size | 20 |
| Film particle count | 8 |

[1] Blended with $TiO_2$ to give a 30% $TiO_2$ composite.

Example IV

Several commercially available extenders suitable for making flat paints were examined in comparison with the improved products. All of them were found to be very gritty exhibiting mix-in particle size counts greater than about 50. None of them produced grit-free films without subjecting the paint to strenuous grinding. The best one found was a calcium carbonate designated here as commercial whiting #3 and is characterized as follows:

| | |
|---|---|
| Color[1] | 12 |
| Oil absorption[1] | 12 |
| Tinting strength[1] | 162 |
| Weight per cent over 5 microns | 93 |
| Weight per cent over 25 microns | 30 |
| Weight per cent between 5 and 25 microns | 63 |
| Mix-in pigment particle size | 45 |
| Film particle count | About 250 |

[1] Blended with $TiO_2$.

The 30% of material above 25 microns makes it wholly unsuitable for producing a grit-free paint by means of simple mixing.

This invention may be applied to any naturally occurring minerals suitable for pigment extenders such as barytes, calcium fluoride, magnesite, celestite, magnesium aluminium silicates, feldspars, silicas, etc. The preferred raw materials are those minerals having a specific gravity not greater than about 2.9 and not less than about 2, a refractive index not greater than about 1.7 or less than about 1.5, and a hardness on Mohs' scale between about 1 and 4. Such minerals include calcite, aragonite, amorphous calcium carbonate, talc, gypsum, anhydrite, quartz and other forms of silica, pyrophyllite, mica, clays, etc.

While my process is essentially one of handling materials in the dry state, the presence of amounts up to about 5% or about 10% of adsorbed or included moisture in the raw material is not excluded from the scope of the invention.

Since these extenders have no covering power when incorporated in oil paints, they are usually blended with prime pigments such as $TiO_2$, $ZnS$, etc. This blending may be done during the compounding of the paint although frequently it is desirable to have the composite pigment already blended in the dry state. I prefer blending them in the dry state by suitable mixing such as is accomplished by a tumble barrel, ribbon mixer, or conical dry blender. The proportion of the improved flatting extender employed depends upon the desired paint properties and the amount of prime pigment used depends upon the covering power or tinting strength desired. Usually I prepare blends comprising a prime pigment and not more than 75% nor less than 10% of the improved extender by weight.

The use of relatively coarse extender materials, particularly those of low specific gravity, for producing flat paints is well known. These materials are ground by various means to certain degrees of fineness usually indicated by the screen openings which they will pass. However, in ordinary samples of these extenders there is a wide range of particle size usually ranging from 100 microns down. In flat paints anything coarser than about 30 microns appears as objectionable grit in the paint film. The particles in the range from 5 microns to about 25 microns act as flatting agents in the film. That is, they are coarse enough to modify the film surface giving it a flat appearance without, however, giving a gritty appearance. When a few coarser particles of above 30 microns diameter are present they protrude above the general surface in an objectionable manner. More thorough grinding of the material will reduce the grit, but at the same time it reduces the average particle size to such an extent that the material loses its flatting action in the paint film.

My invention provides a means of placing the average particle size of the improved product more completely within the range which causes flatness in a paint film and at the same time leaves the film free of grit. This particle size range has been found to lie between about 5 microns and 25 microns.

In all the preferred modifications of my process compression grinding is employed. I have found that compression grinding is the only dry method of reducing the particles in the pigment size range without endangering their whiteness through abrasion of the machine. In compression grinding, most of the work is done by compressing and rubbing pigment against pigment from which no contamination can arise. It is to increase this effect that I keep the mill as heavily loaded as possible. This type of grinding also tends to pack the finer particles into agglomerates. Therefore, I employ the disintegration step to disperse these agglomerates.

Although materials produced by my novel process are especially useful as extenders for flat oil paints, they may also be used in the various water paints, such as casein paint, etc.

While the primary use of these products will probably be in preparing flat paints they may also be used as paper fillers, rubber fillers, or in the various fields where these unique particle size characteristics have an advantage over present materials.

The advantages possessed by these products are derived from two sources, first, the method of grinding and classifying the raw materials and second, the particle size characteristics which are herein specified for them.

The table below shows a comparison between a calcium carbonate material produced in accordance with my herein-described invention and a prior art calcium carbonate material, said prior art material being representative of such materials for sale on the market:

|  | $CaCO_3$ of this invention | $CaCO_3$ of prior art |
|---|---|---|
| Mix-in pigment particle size | 20 | +50 |
| Weight over 25 microns percent | −0.5 | 30 |
| Tinting strength [1] | 160 | 157 |
| Oil absorption [1] | 12.2 | 12 |
| Color [1] | 13 | 12 |

[1] Blended with 30 weight percent of titanium dioxide (based on total solids).

The above shows the great superiority in particle size characteristics of the product of this invention over the prior art product. Further, because of the mix-in particle size of 20 microns, it is seen that it may be incorporated in a paint by simple mixing and the resulting paint film will be essentially grit-free whereas with the prior art products it is necessary to subject the paint to severe grinding in order to make a passably smooth paint film.

A further advantage possessed by the improved products of this invention is their high flatting efficiency. It is well known that the whiteness of ground natural products is not equal to that of the best white pigments, therefore, the less flatting extender required the whiter the resultant blend. Another advantage is the fact that the materials are dry processed and therefore offer a considerable cost saving over wet methods which must be followed by an expensive drying step.

As many apparently widely different embodiments of this invention may be made without departing from the spirit and scope thereof, it is to be understood that I do not limit myself to the specific embodiment except as defined in the appended claims.

Having described the present invention the following is claimed as new and useful:

1. A process for the production of improved, mix-in types of extender materials substantially all of which comprise particles having a diameter of at least 5 and up to about 25 microns, which comprises subjecting crushed, naturally-occurring inorganic extender materials capable of passing a screen having 4 meshes to the inch, having a specific gravity between about 2 and about 2.9, an average refractive index between about 1.5 and about 1.7, and a hardness on Mohs' scale between about 1 and about 4, to compression grinding in a ring-roller mill equipped with a whizzer type of air separator, air-classifying the resulting product, returning the coarser particles of greater than 25 micron size from said air-classification step to said compression grinding zone for re-treatment, subjecting the fines recovered from said air-classification to disintegration treatment consisting of the dispersive action produced by subjecting said fines to a rapid succession of impacts while in air suspension, air-classifying the product from said disintegration treatment, and then recovering from the latter classification treatment extender material particles ranging in size from about 5 to 25 microns.

2. A process for the production of a mix-in type of calcium carbonate useful in flat coating compositions and substantially all of the particles of which have a diameter of at least 5 and up to about 25 microns, which comprises subjecting calcium carbonate capable of passing a screen having 4 meshes to the inch, having a specific gravity between about 2 and about 2.9, an average refractive index between about 1.5 and about 1.7, and a hardness on Mohs' scale between about 1 and about 4, to compression grinding in a ring-roller mill equipped with a whizzer type of air separator, air-classifying the resulting product, returning the coarser particles of greater than 25 micron size from said air-classification step to said compression grinding zone for re-treatment, subjecting the fines recovered from said air-classification to disintegration treatment consisting of the dispersive action produced by subjecting said fines to a rapid succession of impacts while in air suspension, air-classifying the product from said disintegration treatment, and then recovering from the latter classification treatment calcium carbonate particles ranging in size from about 5 to 25 microns.

RAY L. McCLEARY.